United States Patent [19]

Kluger et al.

[11] Patent Number: 5,248,027
[45] Date of Patent: Sep. 28, 1993

[54] METHOD AND APPARATUS FOR BELT STEERING CONTROL

[75] Inventors: Jacob N. Kluger, Rochester; Ssujan Hou, Webster; Lam F. Wong, Fairport; Stephen C. Arnone, Rochester, all of N.Y.

[73] Assignee: Xerox Corporation, Stamford, Conn.

[21] Appl. No.: 992,685

[22] Filed: Dec. 18, 1992

[51] Int. Cl.⁵ .................................... B65G 39/16
[52] U.S. Cl. ........................ 198/502.4; 242/57.1; 198/807
[58] Field of Search ............... 198/502.1, 502.4, 806, 198/807; 242/57.1

[56] References Cited

U.S. PATENT DOCUMENTS

| | | | |
|---|---|---|---|
| 1,972,075 | 9/1934 | Clark | 242/57.1 |
| 3,323,699 | 6/1967 | Bricker, Jr. | 242/57.1 |
| 3,323,740 | 6/1967 | Blessing | 242/57.1 |
| 3,366,876 | 1/1968 | Kurth et al. | 242/57.1 |
| 3,627,301 | 12/1971 | Benson | 242/57.1 X |
| 4,061,222 | 12/1977 | Rushing | 198/807 |
| 4,462,676 | 7/1984 | Shimura et al. | 198/806 X |
| 4,485,982 | 12/1984 | St. John et al. | 242/57.1 |
| 4,500,045 | 2/1985 | Whitaker et al. | 242/57.1 |
| 4,557,372 | 12/1985 | Rajagodal | 198/807 |
| 4,839,674 | 6/1989 | Hanagata et al. | 242/57.1 X |
| 4,959,040 | 9/1990 | Gardner et al. | 198/807 X |
| 5,096,044 | 3/1992 | Biebel | 198/807 X |

FOREIGN PATENT DOCUMENTS

| | | | |
|---|---|---|---|
| 0421164 | 4/1991 | European Pat. Off. | 198/806 |
| 0178111 | 9/1985 | Japan | 198/806 |

Primary Examiner—D. Glenn Dayoan
Attorney, Agent, or Firm—Finnegan, Henderson, Farabow, Garrett & Dunner

[57] ABSTRACT

A method for controlling lateral positioning of a longitudinally moving endless belt having at least two targets aligned with tolerances on a longitudinal fixed reference line, in which belt displacement from the fixed reference line is measured at least two times during each revolution of belt movement to provide a current value of measured displacement and at least one prior value of measured. The current value of measured displacement and the at least one prior value of measured displacement are averaged to provide a current average value of measured displacement and a current average value of measured displacement is calculated for each successive current value of measured displacement to provide a belt steering correction factor used to steer the belt as necessary to reduce the current average value of measured displacement to zero. Each of the targets is preferably an apertured pattern of N-shaped configuration formed in the belt. Apparatus for carrying out the method includes a steering roller about which a portion of said belt is trained, a yoke for supporting said steering roller for angular movement about a longitudinal axis, and a stepping motor/cam device for adjusting the angular position of said steering roller about said longitudinal axis.

17 Claims, 6 Drawing Sheets

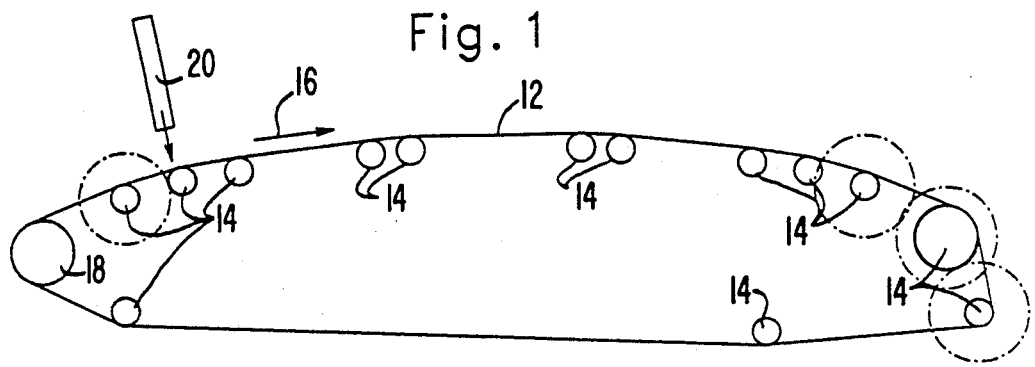
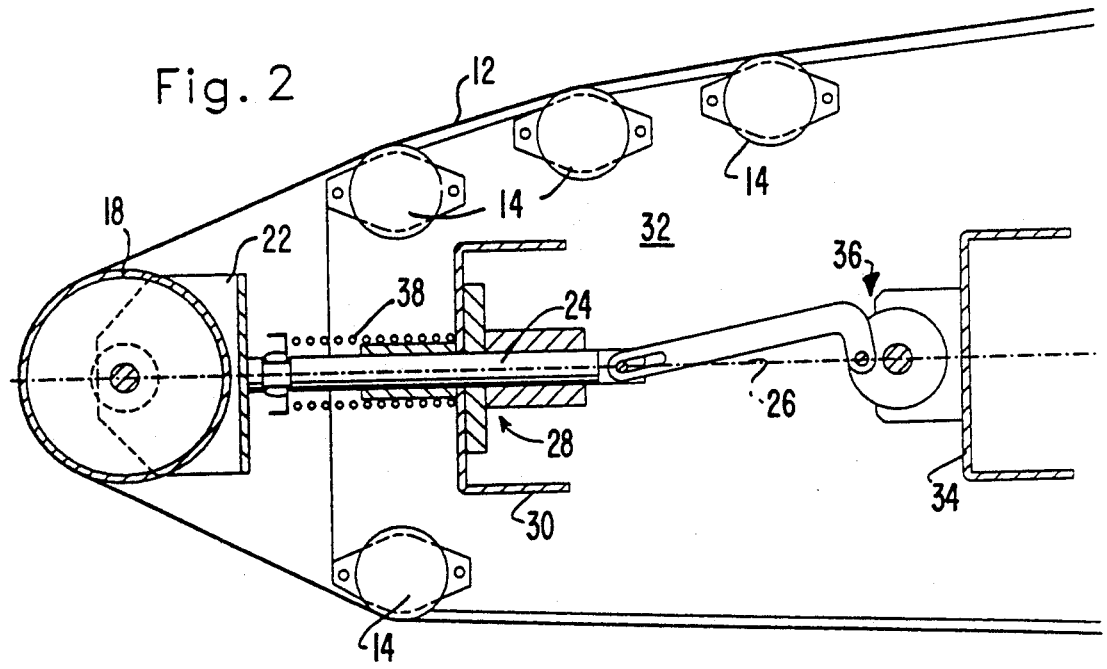

(#1)  $y[mm] = C_{scale}[mm/clk] \times (n1 - n2)[clks] \times \tan \zeta /4$

METHOD AND APPARATUS FOR BELT STEERING CONTROL

BACKGROUND OF THE INVENTION

FIELD OF THE INVENTION

The present invention relates to a method and apparatus for controlling the position of a longitudinally moving belt and, more particularly, to such a method and apparatus by which the belt may be controlled with high precision.

DESCRIPTION OF THE RELATED ART

Recently developed digital-input color copiers and printers require separate images in yellow, magenta, cyan, and black to be registered on an output sheet within a 0.1 mm diameter circle. To achieve this degree of registration precision, the rate-of-change of lateral position of the photoreceptor (PR) belt may not exceed ±0.25 mm over three consecutive images. Overall, the lateral belt position must be held in a range of about ±0.1 mm.

Although many types of steering systems have been devised for maintaining alignment of endless belts generally, recent developments in belt tracking control for copiers and printers have been inclined to "active" steering systems in which an electric motor drive tilts the steering roll in response to power on/off commands. Signals from an opto-sensor establish the position of the edge of the belt. A micro processor controller determines once in each belt revolution whether the belt is on one side or the other of the set point position. Corrective steering commands are then deduced from the combination of relative belt position and the number of iterations according to a specialized set of control rules. This system achieves lateral control within ±0.3 mm.

A diagonal line sensor has recently been applied to belt tracking control called "phase plane control," using a similar mechanism. Belt position is again measured each revolution, but the additional information available from the diagonal line sensor enables improved corrective action. Steering commands are deduced from the combination of position, its rate of change, and the number of iterations according to a specialized set of control rules. This system has a position limit cycle of 14 mm peak-to-peak, but the displacement rate is low enough to achieve a range of 0.3 mm over consecutive color separations.

U.S. Pat. No. 4,557,372 discloses an alignment apparatus for a belt system which is representative of belt control schemes that rely on independent measurements of two or more target patterns on the belt. In these types of systems, lateral displacement of each individual target is sensed and a displacement signal input to a belt steering device. The major difficulty with this type of belt alignment control is that the accuracy of alignment is dictated by the accuracy of the individual targets on the belt. In order to achieve target precision within ±0.1 mm, the costs of manufacturing the belt and providing the targets becomes excessive.

Current color printers use relatively thin and fragile plastic film based photoresistive belts. These belts are produced as long continuous coated strips. The finished photoresistive belt is made by slitting the strip to width, cutting to length, die-punching slits and holes as required, and joining the seam to make a loop. Such manufacturing processes do not contribute to the kind of precision required of belt carried indicia to provide belt alignment within 0.1 mm using existing belt steering technology.

SUMMARY OF THE INVENTION

In light of the foregoing, an object of the present invention is to provide a method and apparatus for maintaining an endless photoreceptor belt to within lateral position variations smaller than the manufacturing tolerances allowed in forming the belt and alignment indicia thereon.

Another and more specific object of the invention is to provide an alignment control method and apparatus for endless photoreceptor belts and by which the lateral position of such belt can be maintained within a 0.1 mm circle.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for controlling a lateral position of a longitudinally moving endless belt by measuring belt displacement from a fixed reference line at least two times during each revolution of belt movement to provide a current value of measured displacement and at least one prior value of measured displacement and averaging the current value of measured displacement and the at least one prior value of measured displacement to provide a current average value of measured displacement. A current average value of measured displacement is calculated for each successive current value of measured displacement to provide a belt steering correction factor. The belt is steered in accordance with the belt steering correction factor as necessary to reduce the current average value of measured displacement to zero.

The objects and purpose of the invention are further achieved and served by such a method in which at least two targets are provided on the belt to be aligned with tolerances on a sensor line, scanning each of the targets with a common fixed sensor to produce for each target a lateral position error signal representing positional variation of the scanned target from the sensor line, and averaging the lateral position error signals for the at least two targets. Each of the targets is an apertured pattern of N-shaped configuration formed in the belt so that the lateral position error signal for each target is determined by a distance n1 along the sensor line between first and second legs of the pattern forming an upright V, and by a distance n2 along the sensor line between the second leg and a third leg of the N-shaped pattern which forms an inverted V.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate and exemplary embodiment of the invention and together with the description, serve to explain the principles of the invention. In the drawings:

FIG. 1 is a schematic side elevation illustrating the flight path configuration of a photoreceptor belt in which the present invention is used;

FIG. 2 is an enlarged fragmentary longitudinal cross section depicting the belt steering mechanism of the present invention;

DESCRIPTION OF THE PREFERRED EMBODIMENT

Figure 3:
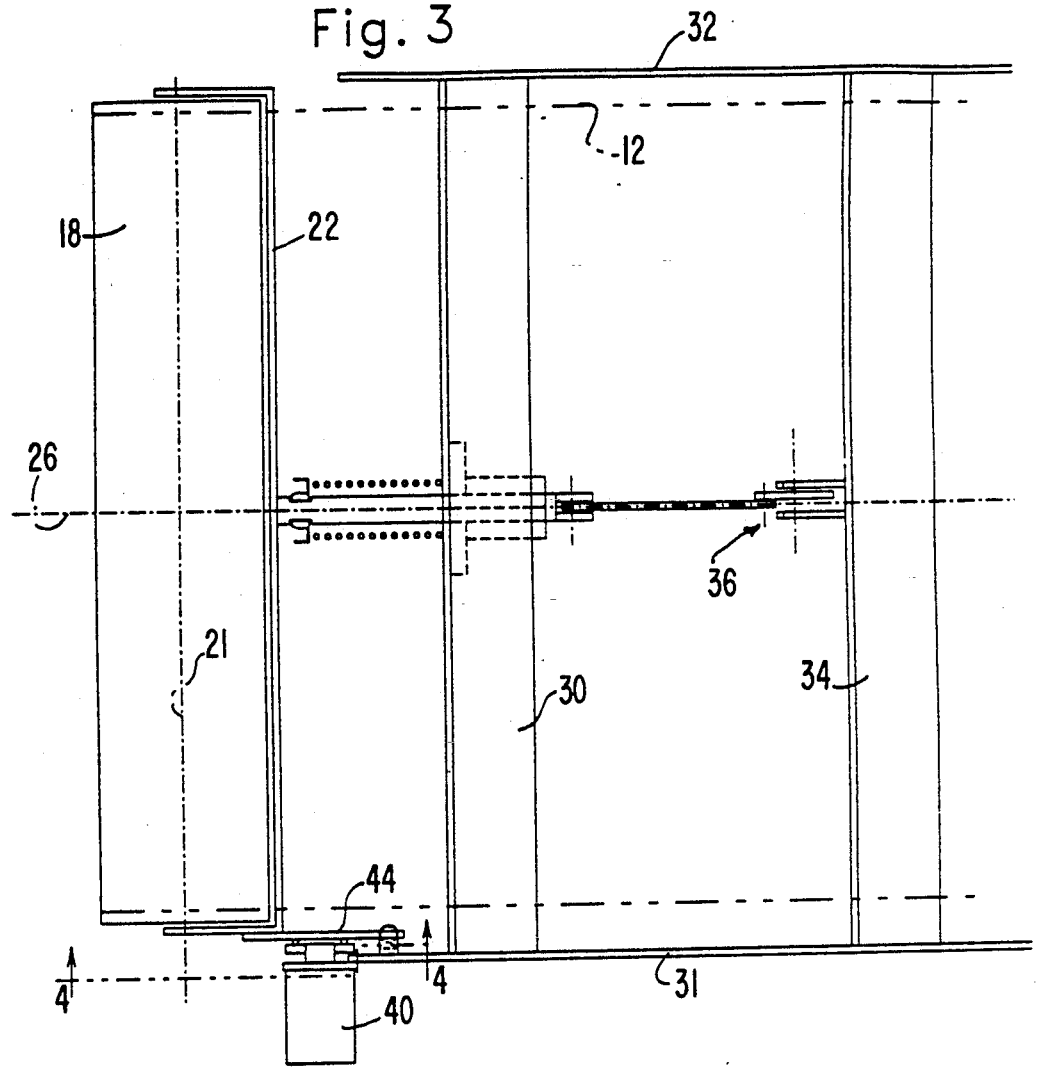
FIG. 3 is a fragmentary, largely schematic plan view of the mechanism shown in FIG. 2.

Reference will now be made in detail to the present preferred embodiment of the invention, an example of which is illustrated in the accompanying drawings. Wherever possible, the same reference characters will be used throughout the drawings to refer to the same or like parts.

In FIG. 1 of the drawings, the general organization and flight path configuration of a photoreceptor belt 12 is shown. The belt 12 is guided about fixed guide rollers 14, one or more of which may be driven to advance the belt 12 in the direction of the arrow 16. At one end of the endless belt loop, that is, the left end as illustrated in FIG. 1, a belt steering roller 18 is located. The steering roller 18 is thus located so that the portion of the belt wrapped on the roller 18 separates opposed major flights or runs in the belt 12. Also, it will be noted that the roller 18 is located upstream from a sensor 20 in terms of the direction of belt travel.

As shown in FIGS. 2 and 3, the steering roller 18 is supported for rotation on an axis 21 by a yoke 22 which, in turn, is carried at the end of a shaft 24 supported for rotation on a central longitudinal axis 26 which extends substantially parallel to the direction of belt travel. The shaft 24 is supported for both rotational and longitudinal movement in a bearing assembly 28 supported by a transverse beam 30 extending between opposite side walls 31 and 32. The side walls 31 and 32 and the beam 30 form part of the support structure for the belt 12. Such support structure is only partially illustrated in the drawings but further includes a transverse beam 34 spaced from the beam 30. The beam 34 supports a crank mechanism 36 which cooperates with a compression spring 38 to control the longitudinal position of the guide roller 18 on the axis 26.

Figure 4:
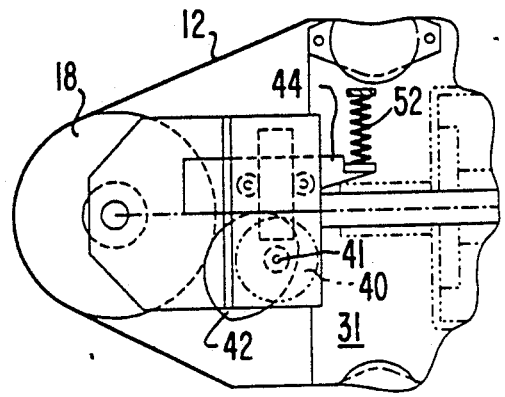
FIG. 4 is a slightly enlarged fragmentary cross section on line 4—4 of FIG. 3.

As illustrated in FIGS. 3 and 4, control of the angular position of the steering roller 18 about the axis 26 is effected by a stepping motor 40 fixed to the side wall 30 and having a final output shaft 41 connected to a cam 42 (FIG. 4). Although not shown, the stepping motor may include reduction gearing in advance of the output shaft 41. The cam 42, in the illustrated embodiment, underlies a follower plate 44 secured to an end of the yoke 22. A compression spring 52 biases the follower plate 44 into engagement with the cam 42 at all times. Thus, it will be appreciated that rotational movement of the cam 42 on the shaft 41 of the stepping motor 40 will operate to tilt the steering roller 18 about the central longitudinal axis 26 in one direction, whereas the spring 52 will bias the yoke 22 to tilt the roller 18 in the opposite direction. Thus, the contour and angular position of the cam will control the tilted position of the steering roller 18 at all times.

Figure 5:
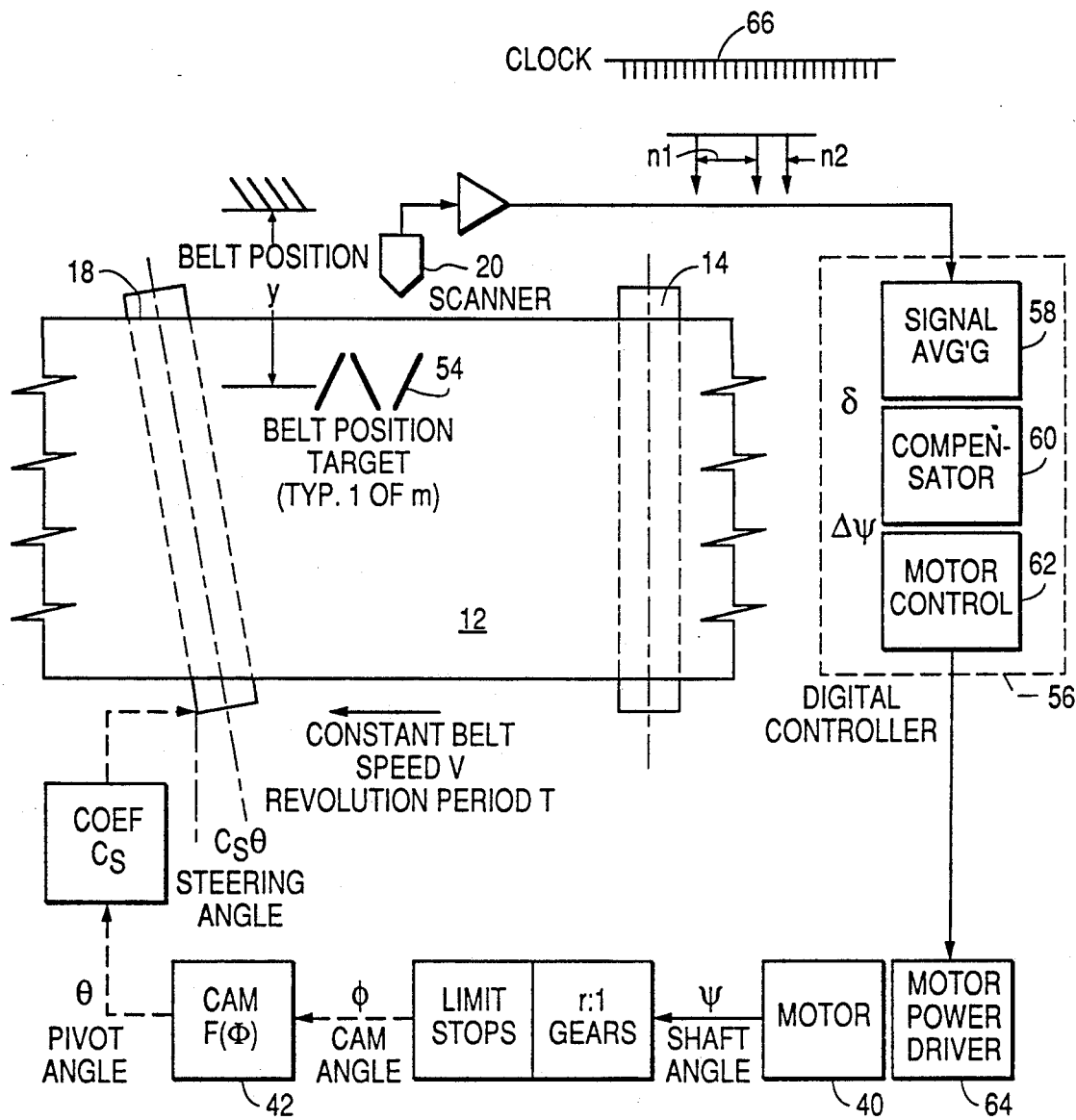
FIG. 5 is a functional block diagram of the belt steering system of the invention.

In FIG. 5, an overall belt steering system embodiment of the invention is schematically illustrated in a functional block diagram. The photoreceptor belt 12 is shown in a developed view, as if it were cut at the loop seam and stretched flat. Also such components previously described with reference to FIGS. 1-4, including the steering roller 18, a guide roller 14, the stepper motor 40 and the cam 42 are schematically represented. In FIG. 5, the belt is shown with a single representative target 54 to be scanned by the sensor or scanner 20 to provide a signal corresponding to lateral belt position y in a manner which will be described in more detail with reference to FIGS. 6 and 7.

The system represented in FIG. 5 includes a digital controller 56 which includes signal averaging, compensator and motor control modules 58, 60 and 62, respectively. The stepper motor 40 is operated by a power driver 64 controlled by the motor control module 62 of the digital controller 56. The controller 56 also includes a clock pulse counter to provide digital intervals of time represented by a clock scale 66 in FIG. 5. A more complete understanding of the control system represented in FIG. 5 and its operation to maintain the lateral position of the belt 12 will be had by reference to FIGS. 6 and 7 of the drawings and the following description of the targets 54 carried by the belt 12.

Figure 6:
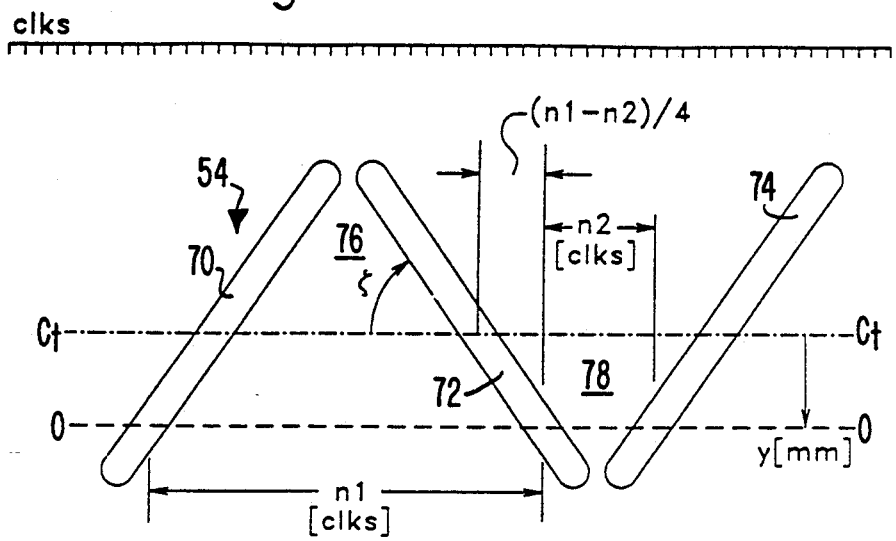
FIG. 6 is a greatly enlarged plan view of a belt target used in the present invention.

As shown most clearly in FIG. 6, the target 54 is defined as a pattern of three legs 70, 72, and 74, preferably formed as linear slots cut through the material of the belt 12, to provide a generally sloped N-shaped target configuration. The slots are inclined relative to a target center line $C_r$—$C_t$, preferably at a common angle $\xi$, the angle of the outer slots 70 and 74 being opposite to (or the supplement of) the angle of the central leg 72. Thus, one outer leg 70 forms a first V 76 with the central leg 72 whereas the other outer leg 74 forms a second V 78 with the central leg 72. The second V 78 is inverted with respect to the first V 76.

In FIG. 6, the dashed line 0—0 represents the scan line of a fixed optical sensor, such as the sensor 20 of FIG. 1, as a result of linear belt and target travel in a direction parallel to the target center line $C_r$—$C_t$. As illustrated, the scan line 0—0 is displaced from the target center line by a lateral distance y. When the scan line is so displaced, the distance n1, measured in clock pulses or "CLKS" on the clock scale 66, represents the time required for the target 54 to travel on the line 0—0 between the leg 70 and central leg 72. Correspondingly, the distance n2, similarly measured, represents the time in clock pulses "CLKS" for target travel on line 0—0 between the central leg 72 and the other outer leg 74. Assuming constant belt velocity, the displacement distance y in millimeters may be calculated using the equation shown in FIG. 6, that is:

$$y[mm] = C_{scale}[mm/clK] \times (n1 - n2)[clk] \times \tan \xi \div 4 \qquad (\#1)$$

The sloped N configuration of the target pattern 54 provides advantages over other target configurations, such as triangular or trapezoidal targets, to measure lateral belt displacement. For example, and as shown in FIG. 5, the precision of the N-slot target measurement is two times the resolution of the triangular or trapezoidal target measurement. That is, for the same displacement y there will be twice as many clock counts. This, in turn, allows correspondingly less speed reduction ratio at lower costs in the steering motor cam drive described above with reference to FIGS. 1-4. In addition, with triangular or trapezoidal targets, the belt displacement is found by timing between the rising and falling edges of the optical sensor signal. Because the rising and falling edge characteristics of an optical sensor, in general, are different, it is not possible to optimize the subsequent signal conditioning circuit for both conditions. This induces error in the triangular or trapezoidal targets. With the N-slot design as shown in FIG. 5, however, the timing is between successive optical sensor signal edges of the same direction, either all rising or all falling, subsequent signal conditioning circuits can be optimized to minimize errors.

Figure 7:
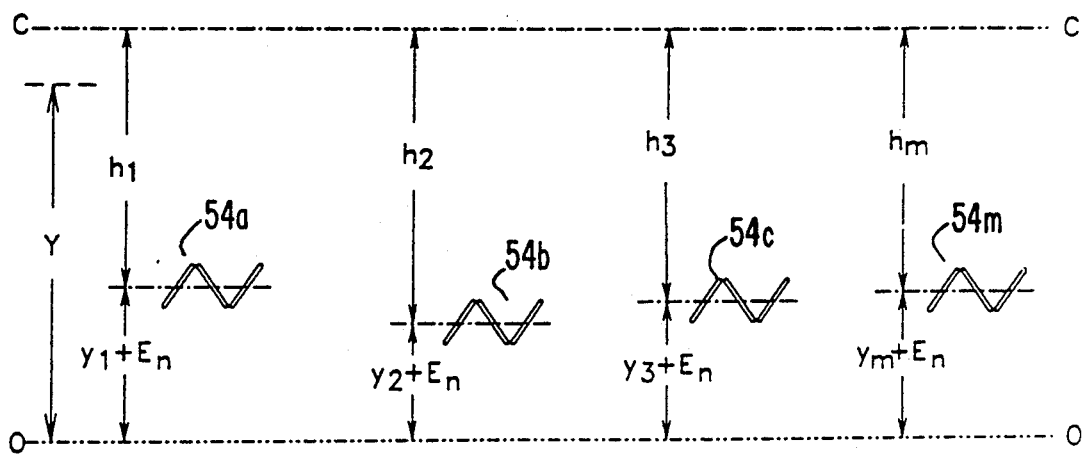
FIG. 7 is a schematic diagram illustrating the relative positions of several targets of the type illustrated in FIG. 6.

In FIG. 7, a plurality of targets $54_a, 54_b, 54_c, \ldots 54_m$ are shown in positions related to an arbitrary reference line, such as the centerline C—C, on the belt 12 and to the fixed scan line O—O of the sensor 20. The scale of such relative positioning is greatly exaggerated in FIG. 7 to illustrate the principles of the invention and facilitate the explanation to follow.

For a single target 54, where h is the distance of the target centerline $C_t$—$C_t$ from the belt centerline C—C and y is the measured distance from the sensor scan-line O—O, the lateral position of the belt 12 for a given measurement is $$Y = y + E[\sigma] + h \quad (\#2)$$

where $E[\sigma]$ is the normally distributed error in the measured value y, $\sigma$ being a standard deviation of E. If, under steering control, y is driven to zero, then $$y_{setpoint} = 0 \quad (\#3)$$

and the belt position setpoint is $$\Psi_{setpoint} = h + E[\sigma]. \quad (\#4)$$

Since the belt reference line C—C is arbitrary, it may be taken through the target center line $C_t$—$C_t$, that is, h=0. This provides the relation $$Y_{setpoint} = E[\sigma]. \quad (\#5)$$

In accordance with the present invention, at least two targets 54 are provided on the belt 12, preferably more than two and, more preferably, as many as can be provided on the belt with an adequate spacing between targets, so that at belt operating speeds, time is afforded after each target scan for belt steering calculations to be made and the calculations implemented by the motor 40 before the next target is scanned. Also in accordance with the method and system of the invention, target positions $y_1 \ldots y_m$ are measured in succession for each revolution of the belt 12 past the sensor 20. Thus, the average lateral position Yavg of the belt 12 for a single revolution is $$Y_{avg} = \frac{1}{m} \sum_i (y_i + e_i + h_i) = \frac{1}{m} \sum_i y_i + \frac{1}{m} \sum_i E[\sigma_i] + \frac{1}{m} \sum_i h_i \quad (\#6)$$

where m=the total number of targets on the belt; i is the subscript designation of individual targets, i.e., i=1, 2, 3, ... m; $h_i$ is the location of a specific target centerline from the belt centerline C—C; $y_i$=the measured distance of a specific target centerline from O—O; $e_i$ is the error in the measurement $+y_i$; $E[\sigma_i]$ is the normally distributed error in a measured value $y_i$; and $\sigma_i$ is the standard deviation error of $E[\sigma_i]$.

The average of target position measurements from the scan line O—O is a variable $y_{avg}$ that is updated m times in each belt revolution, i.e., $$y_{avg} = \frac{1}{m} \sum_i y_i \quad (\#7)$$

The average of the normally distributed measurement is another normal distribution. Assuming that the m measurement distributions are equal ($\sigma_i = \sigma$) gives $$\frac{1}{m} \sum_i E[\sigma_i] = E[\sigma] \quad (\#8)$$

The average of target locations $h_{avg}$ is another constant value in accordance with the equation, $$h_{avg} = \frac{1}{m} \sum_i h_i \quad (\#9)$$

Finally, the resulting expression for the average value of belt position corresponds, term for term, with the case of a single target as explained above:

$$Y_{avg} = y_{avg} + E[\sigma] + h_{avg} \quad (\#10)$$

Figure 8:
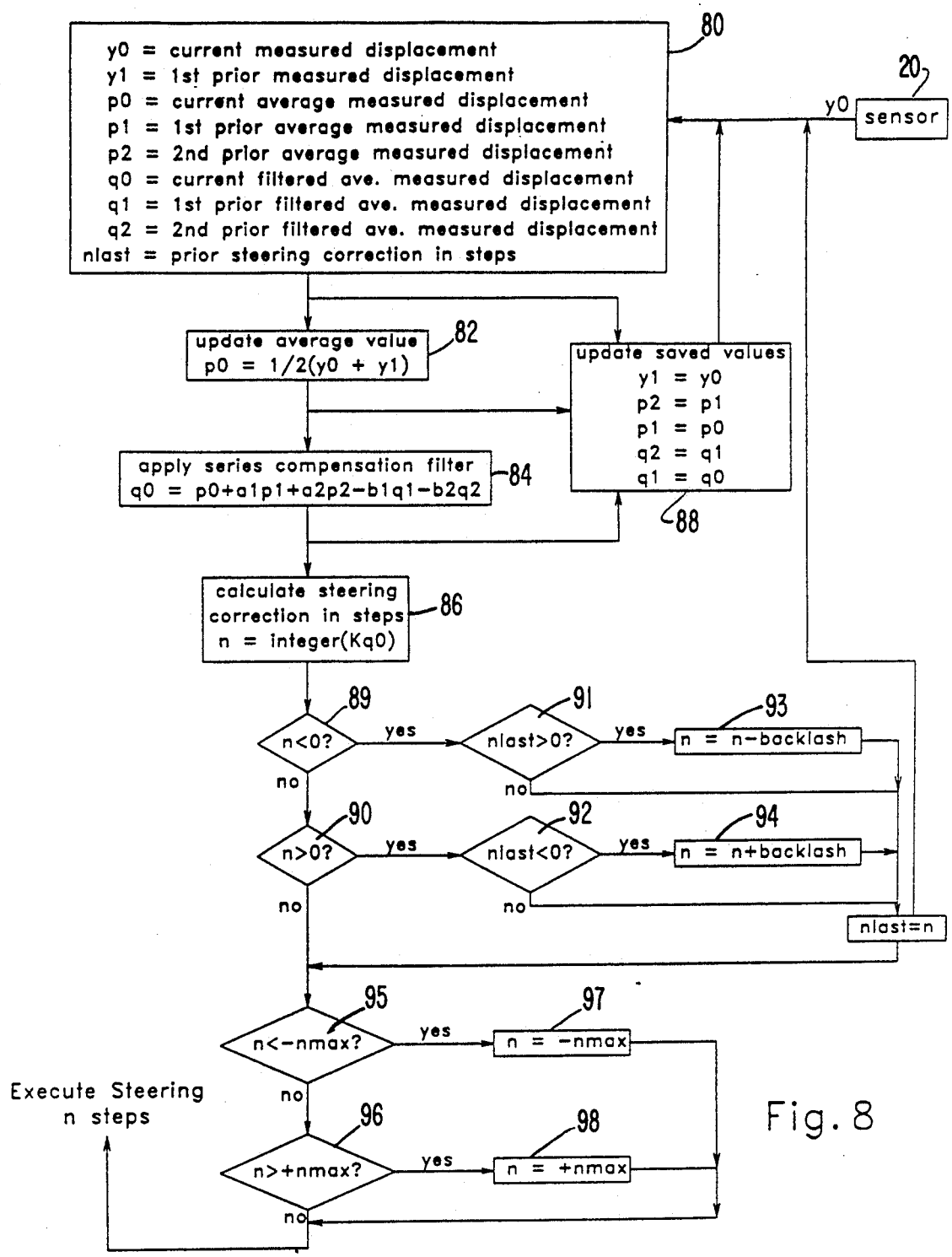
FIG. 8 is a flow chart illustrating signal processing logic of the invention.

The method and system for controlling the lateral position of the belt 12, using the position measurement value of two targets on the belt, may be understood with reference to the flow chart shown in FIG. 8. As indicated by legend in a data entry block 80, all values except the current measured displacement value y0 are provided by data sampled prior to a determination of the value y0. Thus, it is presumed that initializing values of y1, p0, p1, p2, q0, q1 and q2 are entered into the block 80 prior to a belt steering operation. As will be seen, however, where a belt with two or more targets 54 is used, all values in the data entry block will be real values after one revolution of the belt 12.

After initialization is completed, each time a target 54 passes the sensor 20, a new value for y0 will be entered. In a following step represented by the block 82 in FIG. 8, the average of the new value y0 and the first prior measured belt displacement value y1 are averaged to provide a current average measured displacement p0.

In a following step, a series compensation filter step is applied to the value p0 in a manner represented by the equation in block 84. The compensation step is used because the belt steering control system represented by the targets 54, the sensor 20 and ultimately the steering roller 18 are in the nature of a closed loop feedback system which requires stabilization to avoid the effect of hunting. Series compensation filters are conventionally used in such control systems and are represented mathematically by the following exemplary z-transform function:

$$K \frac{(z - A_{lead})(z + A_{lag})}{(z + B_{lead})(z - B_{lag})}$$

In the equation of block 84, the values a1, a2, b1 and b2 are related to the values of the z-transform function as follows:

$$a1 = A_{lag} - A_{lead}$$

$$a2 = A_{lag} \times A_{lead}$$

$$b1 = B_{lead} - B_{lag}$$

$$b2 = B_{lead} \times B_{lag}$$

In practice, the values of the terms a1, a2, b1 and b2 are determined by characteristics of the control system as well as characteristics of the device controlled. The constant K is similarly selected. Thus, for a given machine, these values may be determined experimentally and are retained as constant values for signal processing.

After the compensation step, the value q0 is used to calculate the steering correction n in steps. This calculation is represented in FIG. 8 by the block 86.

Following the calculation of the steering correction value n, the value n is processed to determine (1) whether it is 0, positive or negative, (2) compared with the prior steering correction, nlast and (3) compensated for backlash. The value of backlash is also a constant value representing the difference between the input to the step motor 40 and the output thereof through the cam 42 to vary the angle of the steering roller 18. As such, backlash will vary for each machine but will remain relatively constant for a given machine.

Processing of the value n in the aforementioned manner is shown in FIG. 8 by the query blocks 89 and 90, 91 and 92 and by the calculation blocks 93 and 94. If the value of n is zero, no further processing of the signal will occur by the blocks 90-94. If the value of n is less than zero or negative, it is first determined by the query block 91 whether the prior steering correction nlast was positive. If the value nlast was not positive, no correction is made by the block 93. On the other hand, if the value nlast was greater than zero, then the value n is corrected for backlash in accordance with the correction indicated in the block 93. Similarly, if the value of n is greater than zero or positive, processing occurs by the query block 92 and the backlash correction indicated in block 94.

When the fully compensated value of n has been determined, the value is stored as the function nlast. In this respect, it will be noticed that as each of the values y0, p0 and q0 are determined for use in a "current" belt steering correction value n, they are stored in a memory represented by the block 88 and updated for each successive target scan by the sensor 20. In this manner, as each new or current measured displacement value y0 is supplied by passage of each target 54 on the belt 12 past the sensor 20, a new steering command is calculated and executed. Each such steering command, moreover, is the result of an average of measured displacements for all targets 54 on the belt and which pass the sensor 20 only once during each complete revolution of the belt 12. If less than all target displacements on a given belt are averaged, the average will not account for all target positional errors and will not be representative. Similarly, an average of more than all target displacements on a belt will result in less than optimum accuracy unless the number of measured target displacements is an integer multiple of the number of targets 54 on the belt.

A final adjustment of the steering correction n involves restricting the number of corrective steps in each belt steering commands to negative and positive maximum values. The steps for so restricting the steering correction are represented by the query blocks 95, 96 and the blocks 97 and 98 in FIG. 8. The limiting of the number of steering steps to be executed by the step motor 40 is necessary to assure that operation of the step motor 40 will be complete for any given steering command prior to issuance of a subsequent steering command. In other words, each time a target 54 passes under the sensor 20, the complete steering operation must be completed before the next target passes under the sensor 20. Thus, the number of steering steps with a larger number of targets will necessarily be decreased as against a belt having only two or three targets 54 thereon.

Figure 9:
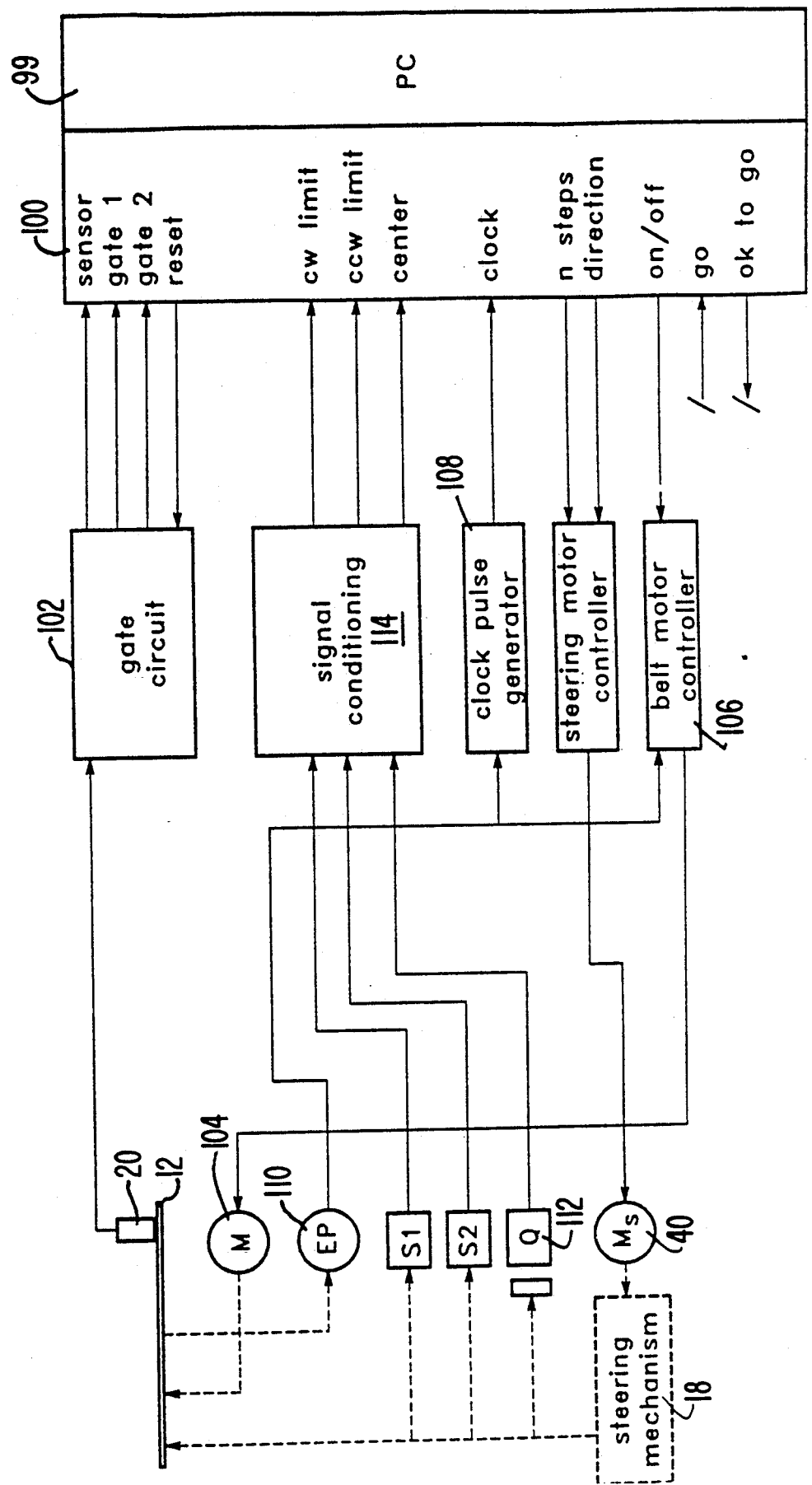
FIG. 9 is a circuit block diagram depicting belt steering circuit components of the present invention.

In FIG. 9, signals and circuits for the belt steering system of the present invention are shown in block diagram form relative to a personal computer 99 and an associated data translation board 100 to provide digital inputs and outputs with counter time facilities. The board 100 operates to convert signals between the personal computer and external circuits and is commercially available under the trade designation "DT2819" from Data Translation, Inc. of Marlboro, Mass.

The output of the sensor 20, upon scanning a target 54 (not shown in FIG. 9) on the belt 12, is fed to a gate circuit 102 which functions to trigger measurements of the distances n1 and n2 described above with reference to FIG. 6. The circuit 102 is reset after these distance measurements in clock pulses for each target 54 are input to the computer 99.

Although not previously described, the belt 12 is driven by a motor 104 under the control of a belt drive motor control circuit 106. The controller 106 operates the motor 104 to drive the belt 12 linearly in synchronism with a clock pulse generator 108. For this operation, the speed of the belt 12 is monitored by an optical encoder device 110 which generates encoder pulses at a frequency corresponding to linear belt velocity. The encoder pulses are input to the clock pulse generator 108 and also in a feedback mode to the belt motor control circuit 106. In this manner, the belt 12 may be driven by the motor at constant speed but more importantly, the number of clock pulses counted during belt travel to represent the distances n1 and n2 at given displacements of each target 54 will be accurate irrespective of minor variations in belt speed.

The system of the present invention further includes a provision for monitoring normal tracking and angular positions of the steering roller on the axis 26. As shown in FIG. 9, a center detector 112 generates a signal when the yoke 22 is in an angular position corresponding to a normal or center tracking position. Such a position of the yoke 22 and steering roller is used to insure that a belt drive cycle is initiated with the steering roller in an angular attitude most likely to provide optimum belt tracking. The center tracking signal is input to a conditioning circuit 114 which functions as an interface to convert the signal generated by the detector 112 to a form capable of being transferred by the interface board 100 to the computer 99. An "ok to go" command is provided by the computer in response to a center tracking signal.

As a safety measure, maximum permitted lateral positions of the belt are detected by a pair of limit switches S1 and S2. When either or these switches is closed, an alarm or shut-off signal will be sent to the computer 99 by way of the signal conditioner 114 and the interface board 100 as lefthand and righthand limits. Other components shown in FIG. 9, such as the steering motor controller, the steering mechanism including the steering roller 18, are as described above and need no further description.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a lateral position of a longitudinally moving endless belt, the method comprising the steps of:
   providing at least two targets on the belt to be aligned with tolerances on a sensor line;
   scanning each of the targets with a common fixed sensor to produce for each target a lateral position error signal representing positional variation of the scanned target from the sensor line;
   averaging the lateral position error signals for the at least two targets; and
   laterally displacing the belt in a direction to reduce average of the lateral position error signals to zero.

2. The method recited in claim 1 wherein each of the targets is an apertured pattern of N-shaped configuration formed in the belt.

3. The method recited in claim 2 wherein the lateral position error signal for each of the targets is determined by a distance n1 along the sensor line between first and second legs of the N-shaped pattern forming an upright V and a distance n2 along the sensor line between the second leg and a third leg of the N-shaped slot which forms an inverted V.

4. The method recited in claim 3 wherein the lateral displacement of the belt is determined by:

$$y[mm] = C_{scale}[mm/clK] \times (n1 - nz)[clk] \times \tan \xi \div 4$$

where
   y is the lateral displacement;
   $C_{scale}$ is a scale factor; and
   $\xi$ is the angle between the second leg and a center line of the N-shaped slot.

5. A method for controlling a lateral position of a longitudinally moving endless belt, the method comprising the steps of:
   measuring belt displacement from a fixed reference line at least two times during each revolution of belt movement to provide a current value of measured displacement and at least one prior value of measured displacement;
   averaging the current value of measured displacement and the at least one prior value of measured displacement to provide a current average value of measured displacement;
   calculating a current average value of measured displacement for each successive current value of measured displacement to provide a belt steering correction factor; and
   steering the belt in accordance with the belt steering correction factor as necessary to reduce the current average value of measured displacement to zero.

6. The method recited in claim 5 wherein the calculating step includes a compensation for closed loop feedback stabilization.

7. The method recited in claim 5 wherein said calculating step includes compensation for backlash.

8. The method recited in claim 5 wherein said calculating step includes compensation for maximum time duration of belt steering between time intervals of belt displacement measurement.

9. The method recited in claim 5 wherein said steering step comprises step-wise angular adjustment of a belt steering roller.

10. The method recited in claim 9 wherein said belt steering factor is an integral number of steps for angular adjustment of the belt steering roller.

11. Apparatus for controlling a longitudinally moving endless belt the maintain lateral positioning thereof in relation to a fixed reference line, the apparatus comprising:
    means for measuring belt displacement from the fixed reference line at least two times during each revolution of belt movement to provide a current value of measured displacement and at least one prior value of measured displacement;
    means for averaging said current value of measured displacement and said at least one prior value of measured displacement;
    means for converting the current average value of measured displacement to a steering command for each successive current value of measured displacement; and
    steering means for adjusting the lateral position of the belt in response to said steering command.

12. The apparatus recited in claims 11 wherein said measuring means comprises at least two targets spaced on the belt to be substantially aligned with the reference line and a fixed sensor located on the reference line for scanning each of the targets to produce for each target a lateral position error signal representing said values of measured displacement.

13. The apparatus recited in claim 12 wherein each of the targets is an apertured pattern of N-shaped configuration formed in the belt and wherein said sensor is an optical sensor responsive to light passing through the apertured pattern.

14. The apparatus recited in claim 11 wherein said steering means comprises a steering roller about which a portion of said belt is trained, means for supporting said steering roller for angular movement about a longitudinal axis, and means for adjusting the angular position of said steering roller about said longitudinal axis.

15. The apparatus recited in claim 14 wherein said adjusting means includes a stepping motor and means for converting the output of said motor to angular adjustment of said steering roller.

16. The apparatus recited in claim 15 wherein said motor is a stepping motor and wherein said converting means comprises a cam driven by said motor and follower means positioned on one end of said means for supporting said steering roller.

17. The apparatus recited in claim 15 wherein said means for converting the current average value of measured displacement comprises means for causing said stepping motor to execute an integral number of steps.

* * * * *